United States Patent [19]
Gellert et al.

[11] Patent Number: 4,810,184
[45] Date of Patent: Mar. 7, 1989

[54] INJECTION MOLDING SYSTEM HAVING MANIFOLD WITH SIDE MOUNTED NOZZLES

[75] Inventors: Jobst U. Gellert; Harald H. Schmidt, both of Georgetown, Canada

[73] Assignee: Mold-Masters Limited, Georgetown, Canada

[21] Appl. No.: 23,776

[22] Filed: Mar. 9, 1987

[30] Foreign Application Priority Data

Feb. 17, 1987 [CA] Canada ................... 529897

[51] Int. Cl.⁴ ................ B29C 45/22; B29C 45/74
[52] U.S. Cl. ..................... 425/548; 425/549; 425/564; 425/570; 425/572
[58] Field of Search ............. 425/549, 570, 57, 548, 425/562, 567, 568, 572, 564

[56] References Cited

U.S. PATENT DOCUMENTS

| | | | |
|---|---|---|---|
| 3,843,295 | 10/1974 | Greenberg et al. | 425/570 |
| 4,268,240 | 5/1981 | Rees et al. | 425/548 |
| 4,312,630 | 1/1987 | Travaglini | 425/570 |
| 4,378,863 | 4/1983 | Schouenberg | 425/570 |
| 4,422,841 | 12/1983 | Alfonsi et al. | 425/549 |
| 4,450,999 | 5/1984 | Gellert | 425/549 |
| 4,468,191 | 8/1984 | Gellert | 425/564 |
| 4,530,654 | 7/1985 | Rose | 425/548 |
| 4,563,149 | 1/1986 | Landis | 425/570 |
| 4,609,138 | 9/1986 | Harrison | 425/588 |
| 4,662,837 | 5/1987 | Anderson | 425/570 |
| 4,702,689 | 10/1987 | Schmidt et al. | 425/549 |

FOREIGN PATENT DOCUMENTS

| | | |
|---|---|---|
| 1177138 | 11/1984 | Canada . |
| 1198266 | 12/1985 | Canada . |
| 4217574 | 9/1967 | Japan .................... 425/574 |

Primary Examiner—Willard Hoag
Attorney, Agent, or Firm—Riches, McKenzie & Herbert

[57] ABSTRACT

This invention relates to an injection molding system having a number of nozzles conveying melt from an elongated manifold to a common cavity. In the preferred embodiment, each heated nozzle has a melt channel which is offset from a central valve pin bore for conveying the melt to the gate. The melt channel extends through a side portion of the nozzle which is bolted to the side surface of the manifold. The bolts provide a seal against leakage of the pressurized melt, while at the same time allow slight lateral movement between the manifold and the nozzle. This provides for thermal expansion of the manifold relative to the nozzle which is accurately located in a well in the core. The system is used for large cavities which require large flow volumes and avoids the difficulty of accurate machining of the large molds to provide sealing.

11 Claims, 6 Drawing Sheets

INJECTION MOLDING SYSTEM HAVING MANIFOLD WITH SIDE MOUNTED NOZZLES

BACKGROUND OF THE INVENTION

This invention relates generally to injection molding and more particularly to a system in which several nozzles are mounted on the side of an elongated manifold to inject through spaced gates to a common cavity, and a method of manufacturing the nozzles.

Injection molding is being used to make larger and larger components, particularly in the automotive industry. In addition to considerably increasing the size of the melt channel, this has led to the use of systems in which several nozzles extend from an elongated manifold through separate gates to a single cavity. These applications normally necessitate very high injection pressures up to 30-40,000 psi. and require very large molds which are difficult to machine with accuracy. In the past, the nozzles have been mounted along the forward face of an elongated manifold with sealing provided by each nozzle being in bearing contact against a shoulder in the mold cavity plate. However, in view of the large mold size and high melt pressure, it has been found to be very difficult to machine to the necessary tolerances to provide reliable sealing. Also in past valve-gated systems, as shown for instance in the applicants' U.S. Pat. No. 4,530,654 entitled "Injection Molding Peripheral Opening Core Ring Gate" which issued July 23, 1985, the melt flows through each nozzle in a channel around the valve pin. However, for the present high volume, high pressure applications it has been found to be more efficient to use a separate melt flow channel offset from the central valve pin bore.

Frequently, these large elongated cavities are non-linear and it is desirable to mount the nozzles in different positions relative to each other to connect to the manifold. The applicants' Canadian patent application Ser. No. 524,208 filed Dec. 1, 1986 entitled "Side Mounted Manifold Block For Variable Orientation of Injection Molding Nozzle" provided one solution to this problem using "manifold blocks." The present invention provides an alternative solution in which the "manifold blocks" are not necessary.

SUMMARY OF THE INVENTION

Accordingly, it is an object of the present invention to at least partially overcome the disadvantages of the prior art by providing an injection molding system having a number of nozzles to convey melt to a common cavity wherein the seal between the manifold and each nozzle is provided by the nozzle being secured to a side surface of the manifold with provision for slight lateral movement therebetween to allow for thermal expansion of the manifold.

It is a further object of the invention to provide a valve-gated side mounted nozzle in which the longitudinal melt channel is offset from the central valve pin bore, and a method of making it.

To this end, in one of its aspects, the invention provides a multi-gate injection molding system having an elongated manifold and a plurality of nozzles, the manifold having a longitudinal melt bore extending from an inlet to a plurality of outlet bores, each outlet bore leading to an outlet on a side surface of the manifold, each nozzle being located in a well in a cavity plate and having a forward and a rear end with a melt channel extending to a central gate leading to a common cavity, with the improvement wherein each nozzle has a side portion extending to a face which projects sidewards from the well adjacent the rear end, the melt channel of each nozzle has a lateral portion and a generally longitudinal portion, the lateral portion extending from an inlet on the face of the side portion around a smoothly curved bend to the longitudinal portion, the longitudinal portion leading to the gate adjacent the forward end, and each nozzle is secured to the manifold with the face of the side portion abutting against a side surface of the manifold with the melt channel inlet in alignment with a respective outlet from the manifold, with provision for slight lateral movement therebetween to provide for thermal expansion of the manifold.

In another of its aspects, the invention further provides a method of manufacturing an elongated injection molding manifold having a main body portion with a forward and a rear end with a central valve pin bore extending therebetween, at least one longitudinally extending electric heater, a side portion which extends to a sidewards projecting face adjacent the rear end, and a melt channel with a lateral portion and a generally longitudinal portion, the lateral portion extending from an inlet on the face of the side portion around a smoothly curved bend to the longitudinal portion, the longitudinal portion being offset from the central valve pin bore until they join adjacent the forward end, comprising the steps of forming the elongated generally cylindrical main body portion of tool steel with a forward end and a rear end, drilling at least one first offset well extending from the rear end of the main body portion to receive said at least one electric heater with a longitudinally extending space therebetween, drilling a second offset well from the rear nd of the main body portion having a predetermined diameter to form the longitudinal portion of the melt channel, drilling the second well adjacent the rear end of the main body portion to form an enlarged diameter portion of the second well, forming a steel plug to fit into the enlarged diameter portion of the second well, the plug having a concentric well extending partially therethrough from a mouth substantially equal in diameter to the second well, machining the main body portion and forming a steel side portion with a face to have matching abutting surfaces, locating brazing material between the match surfaces of the main body portion and the side portion and around the plug, and introducing copper into the longitudinally extending space around at least one electric heater in a vacuum furnace which is heated for a sufficient period of time and at a temperature to cast in the electric heater and braze the plug and the side portion to the main body portion to form an integral unit with the face of the side portion projecting sidewards, drilling a bore from the face of the side portion to intersect the second offset well in the plug to form the lateral portion of the melt channel which joins the longitudinal portion at a smoothly curved bend, drilling a central bore from the rear end to a mouth at the forward end of the main body portion to receive the valve pin therethrough, and drilling diagonally through the mouth of the valve pin bore to connect to the longitudinal portion of the melt channel adjacent the forward end.

Further objects and advantages of the invention will appear from the following description, taken together with the accompanying drawings.

DETAILED DESCRIPTION OF THE DRAWINGS

Figure 1:
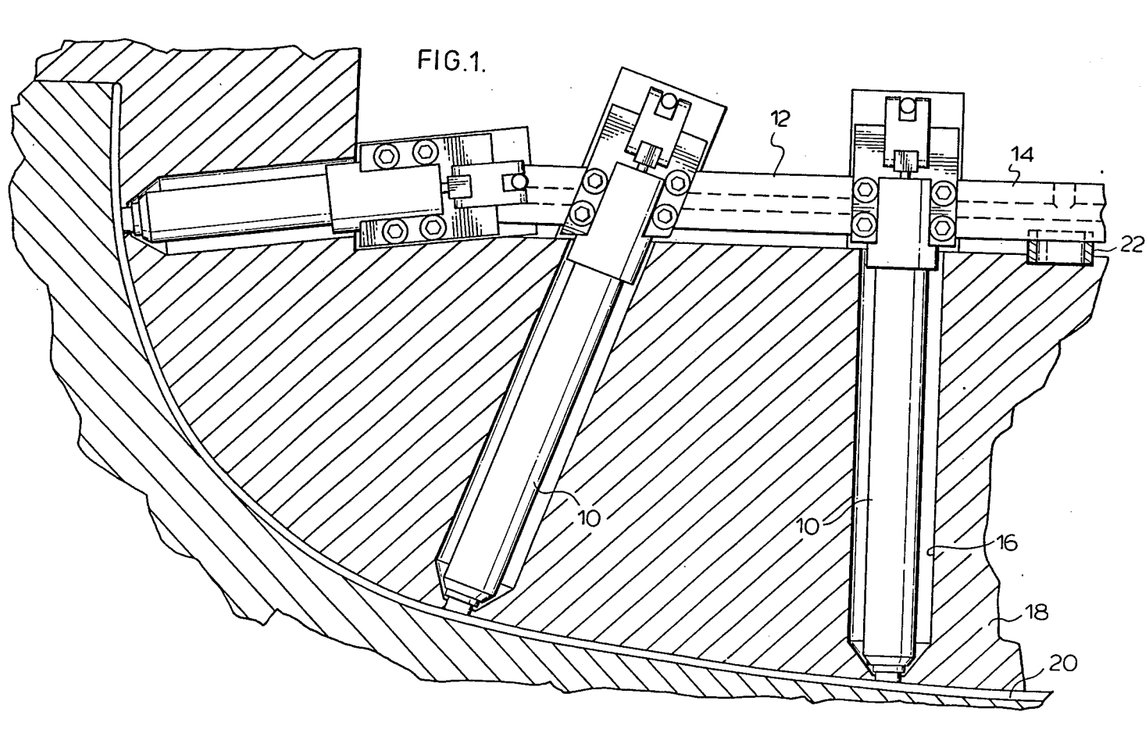
FIG. 1 is an elevation view showing a portion of an injection molding system having a number of nozzles mounted against a side surface of an elongated manifold according to a preferred embodiment of the invention.

Reference is first made to FIG. 1 which shows a portion of a valve gated injection molding system having a number of nozzles 10 mounted directly to one side surface 12 of an elongated manifold 14. The nozzles 10 are each located in a well 16 in a core 18 to convey melt from the manifold 14 to a common non-linear cavity 20.

Figure 2:
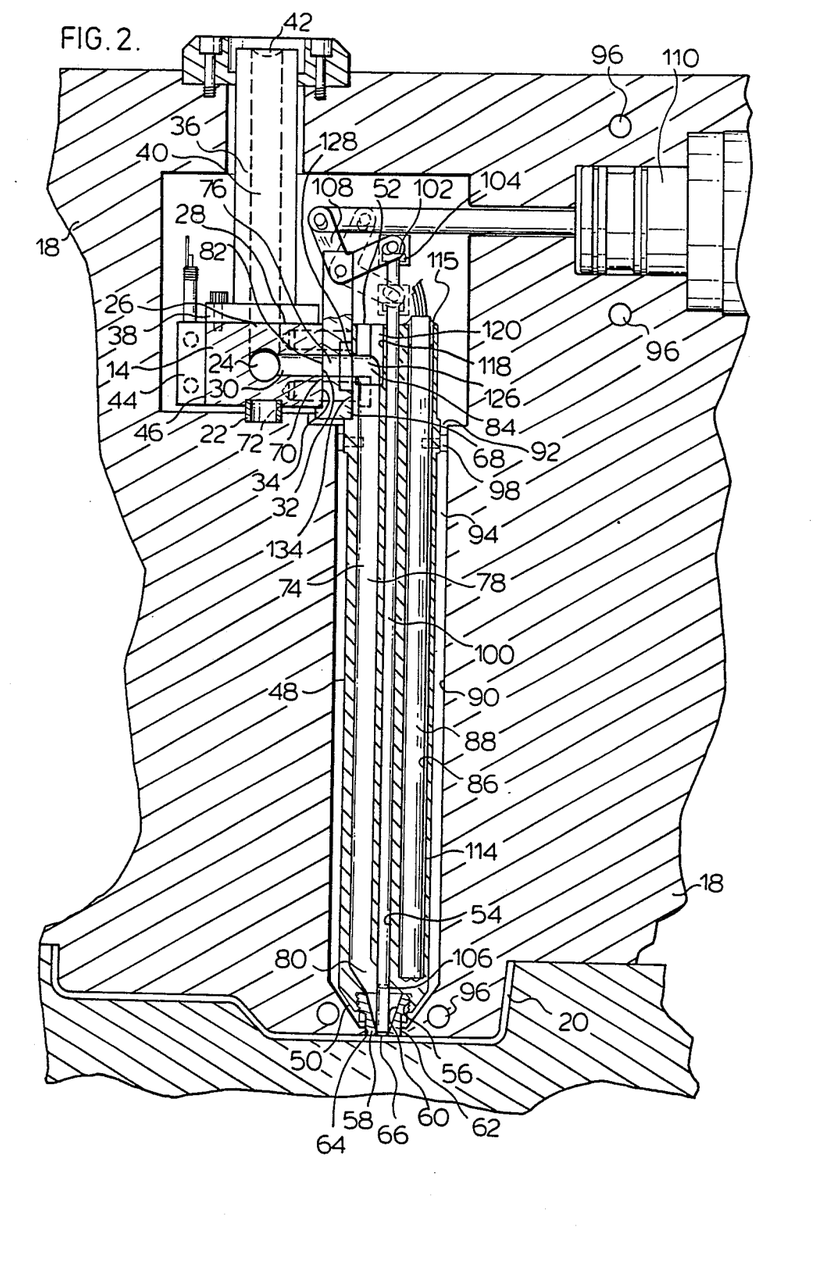
FIG. 2 is a cross sectional view showing one of the nozzles seen in FIG. 1.

Referring also to FIG. 2, the manifold 14 is located relative to the core 18 by a central locating ring 22 seated between them, and has a longitudinal melt bore 24. The longitudinal melt bore 24 connects an inlet 26 on the rear surface 28 to a number of outlet bores 30 each of which branches out to an outlet 32 on a side surface 34 of the manifold 14. A heated melt conveying tube 36 with a flanged portion 38 bolted to the rear surface 28 of the manifold has a central bore 40 in alignment with inlet 26 to receive pressurized melt from a molding machine through recessed inlet 42. In this embodiment, the manifold 14 is heated to a predetermined temperature by an electric plate heater 44 which is bolted to the other side surface 46 of the manifold 14.

Each nozzle 10 has a generally cylindrical outer surface 48, a forward end 50 and a rear end 52 with a central valve pin bore 54 extending therebetween. In this embodiment, the valve pin bore 54 has an enlarged mouth 56 which is threaded to securely receive a tip insert 58 at the forward end 50. The tip insert 58 has a tapered central bore 60 in alignment with the valve pin bore 54, and a cylindrical nose portion 62 which is received in an opening 64 through the core 18, whereby the central bore 60 of the tip insert 58 forms a gate 66 leading to the cavity 20.

The rear end 52 of each nozzle 10 extends out of its well 16 and a side portion 68 with a face 70 which projects sidewards adjacent the rear end 52 is secured to the side surface 34 of the manifold 14 by bolts 72. The nozzle 10 has a melt channel 74 with a lateral portion 76 and a generally longitudinal portion 78. As can be seen, the longitudinal portion 78 extends parallel to but offset from the central valve pin bore 54 until a diagonal portion 80 extends to connect it to the valve pin bore 54 adjacent the forward end 50 of the nozzle 10. The lateral portion 76 of the melt channel 74 extends from an inlet 82 on the face 70 and connects to the longitudinal portion 78 at a smoothly curved bend 84. The melt channel inlet 82 is in alignment and equal in diameter to a respective outlet 32 on the side surface 34 of the manifold, and the bolts 72 are tight enough to prevent leakage of pressurized melt between the nozzle 10 and the manifold 14.

Each nozzle 10 also has two longitudinally extending wells 86 offset from the central valve pin bore 54 in each of which is received a cylindrical cartridge heater 88 to maintain the temperature of the nozzle 10 at a predetermined level. Each well 16 in the cavity plate has a generally cylindrical inner wall 90 and a mouth 92. The generally cylindrical outer surface 48 of the nozzle is smaller in diameter to provide an insulative air space 94 between the heated nozzle 10 and the surrounding core 18 which is cooled by cooling water flowing through cooling conduits 96. Locating screws 98 are spaced around the circumference of the nozzle 0 to accurately locate it against the wall 90 of the well 16 adjacent the mouth 92. Thus, the forward end 50 of the nozzle 10 is accurately located by the nose portion 62 of the tip insert 58 received in the opening 64 in the cone, and the rear end of the nozzle is located by the locating screws 98. While the nozzle 10 is secured in this position, the bolts 72 attaching it to the side surface 34 of the manifold allow slight lateral movement between them to provide for thermal expansion of the manifold 14 when the system is first heated up. It has been found that these connections between the nozzles and the manifold can be tight enough to prevent leakage, yet allow for this necessary lateral movement Thus, connecting the nozzles 10 to the side surface 34 of the manifold provides for sealing without extremely accurate machining, and also overcomes the locating and thermal expansion problem An elongated valve pin 100 is located in the central valve pin bore 54 of each nozzle. Each valve pin 100 has a driven end 102 with an enlarged head 104 and a tapered tip end 106. In this embodiment, the driven end 102 of the valve pin 100 is connected to a rocker arm 108 which is driven by hydraulic actuating mechanism 110. As can be seen, the rocker arm 108 is pivotally connected to the side portion 68 of the nozzle which projects rearwardly for this purpose. The hydraulic actuating mechanism 110 is well known in the art, similar to that disclosed in U.S. Pat. No. 4,468,191 to Gellert which issued Aug. 28, 1984 and need not be described in detail. Controlled hydraulic fluid applied to the actuating mechanism 110 reciprocates the valve pin 100 between a forward closed position in which the tip end 106 is seated in the gate 66 and a retracted open position as shown in FIG. 2.

In use, after the system has been assembled as described above, electrical power is applied to the plate heater 44 and the cartridge heaters 88 to heat the manifold 14 and the nozzles 10 to a predetermined operating temperature. This increase in temperature causes thermal expansion of the manifold and, as mentioned above, the bolts 72 allow the manifold to move laterally relative to the nozzles 10. This brings the outlets 32 on the side surface of the manifold into alignment with the inlet 82 to the melt channel 74 of the respective nozzle. Pressurized melt is then introduced into the manifold melt bore 24 by a molding machine (not shown) positioned at the recessed central inlet 42. Melt pressure is controlled according to a predetermined cycle in conjunction with the application of controlled hydraulic pressure to the actuating mechanism, in a conventional manner. With the valve pins 100 in the retracted open position, the melt flows through the gates 66 and fills the cavity 20. After the cavity is full, injection pressure is held momentarily to pack and hydraulic pressure is then applied to drive the valve pins 100 to the forward closed position with the tip end 106 of each valve pin 100 seated in one of the gates 66. The injection pressure is then released and this position is held for a short cooling period before the mold is opened for ejection. After ejection, the mold is closed and hydraulic pressure reapplied to draw the valve pin 100 to the retracted open position. Melt injection pressure is reapplied to refill the cavity, and the molding cycle is repeated continuously in a uniform cycle, depending on the size and shape of the cavity and the type of material being molded.

Figure 4:
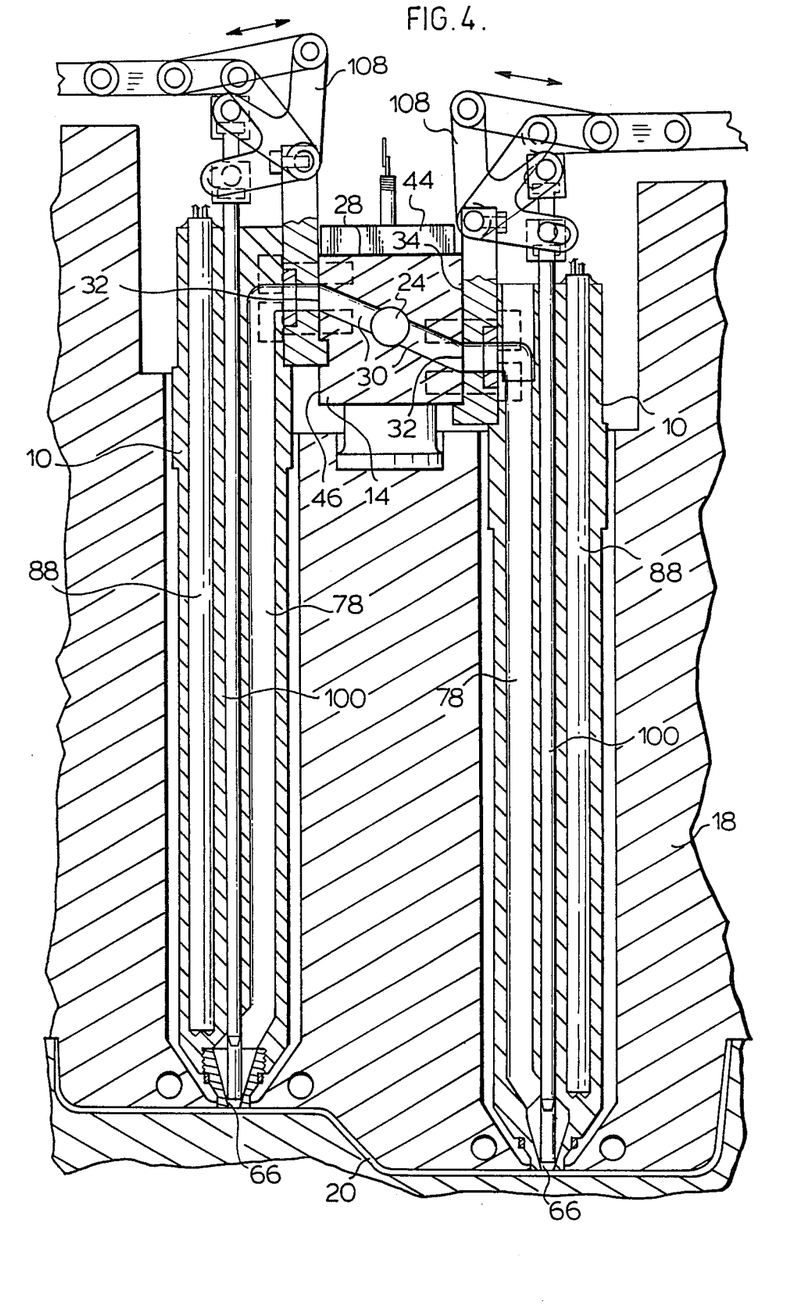
FIG. 4 is a cross sectional view similar to FIG. 2 showing nozzles mounted to opposite side surfaces of the manifold according to another embodiment of the invention.

FIG. 4 illustrates a second embodiment of the invention. As most of the elements are identical to those of the first embodiment described above, elements common to both embodiments are described and illustrated using the same reference numerals. In this embodiment of the invention, nozzles 10 are also mounted on the other side surface 46 of the manifold. As can be seen, the electric plate heater 44 has accordingly been moved to the rear surface 28 to make room. Another valve pin actuating mechanism 110 is mounted to actuate the valve pin 100 in each nozzle. This configuration is used to increase flow and reduce the time necessary to mold very large parts. While the nozzles 10 are the same as those described above and need not be described again, in this embodiment there is a difference in the manifold 14. As can be seen, the outlet bores 30 extending from the longitudinal bore 24 to the outlets 32 on the side surfaces 34,46 extend on the diagonal. This allows the gates 66 of each pair of nozzles 10 to be at different levels on a contoured cavity, while using nozzles of equal dimensions. Of course, only one of the outlet bores 30 could be on the diagonal and the angle can be selected depending upon the desired shape of the cavity. This permits the use of standard dimension nozzles for a wide variety of applications. The use of the system according to this embodiment is the same as that described above, and need not be repeated.

The steps involved in the manufacture of nozzles 10 according to the invention will now be described with particular reference to FIGS. 2, 3 and 5-7. A main body portion 112 is machined of a tool steel such as H13 to have a generally cylindrical outer surface 48. A pair of wells 86 offset from the center are then drilled from the rear end 52 of the main body portion 112 to receive cylindrical cartridge heaters 88 in them. The wells 86 are drilled large enough to leave a small space 114 around the cartridge heaters 88 when they are inserted into the wells. A flanged sleeve 115 is then inserted into each well 86 around the cartridge heater 88 to seal the space 114 at the rear end 52 of the nozzle. Another well 116 is drilled from the rear end 52 of the main body portion 112 to form the longitudinal portion 78 of the melt channel 74. This well 116 is then drilled again to provide an enlarged diameter portion 118 adjacent the rear end 52. A tool steel plug 120 is then made to fit in the enlarged portion 118 of the well 116. The plug 120 has a generally cylindrical outer surface 122 with a circumferential groove 124 extending around it. A well 126 having a mouth 128 which is equal in diameter to the well 116 is drilled in the plug 120. A copper ring 130 is placed in the groove 124 and the plug is inserted into the enlarged portion 118 of the well 116 with the well 126 in the plug 120 in alignment with the well 116 in the main body portion 112. A description similar to these steps relating to the plug are disclosed in the applicants U.S. Pat. No. 4,609,138 entitled "Method of Manufacturing Injection Molding Manifold with Plugs" which issued Sept. 2, 1986.

Figure 3:
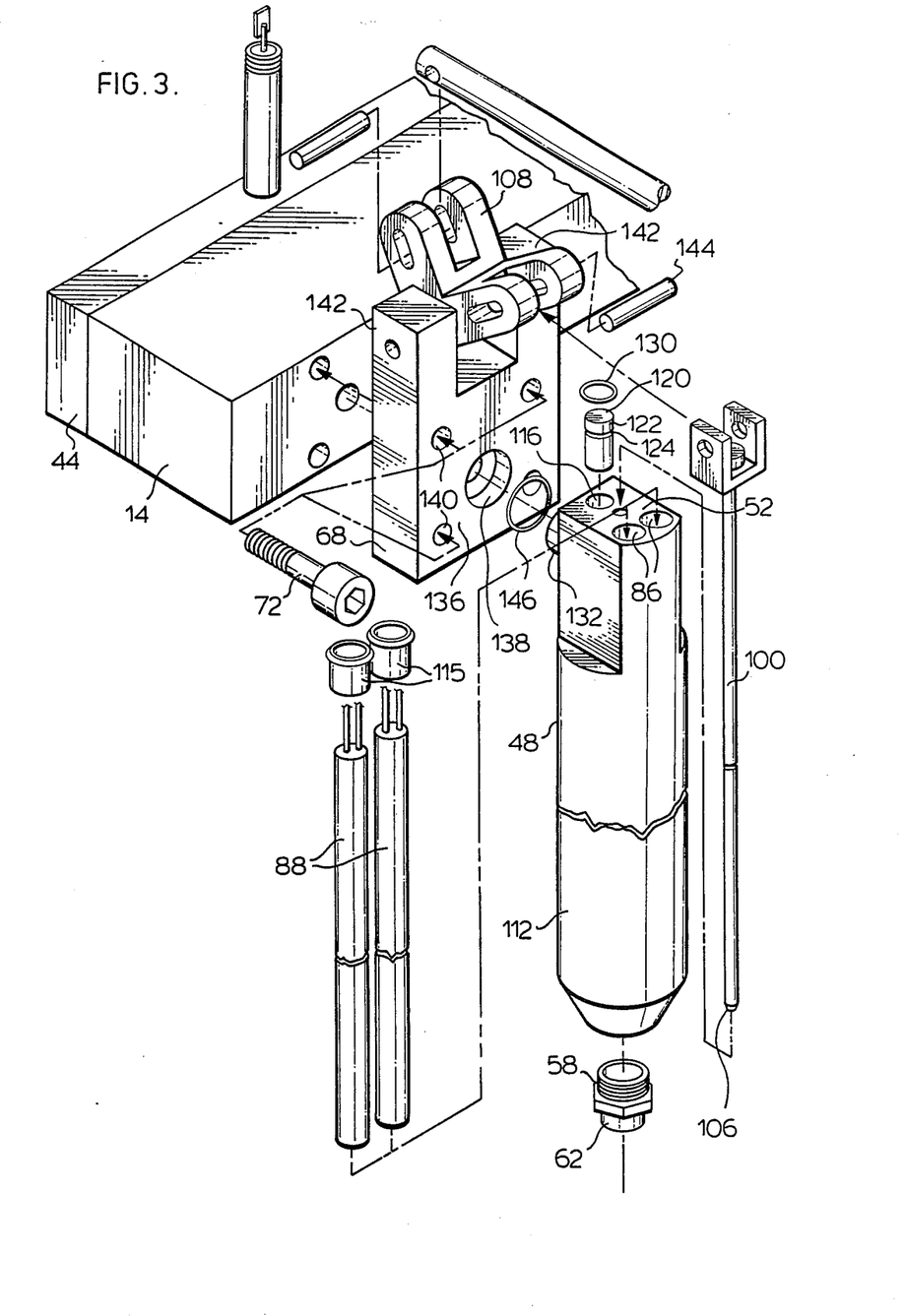
FIG. 3 is an exploded isometric view showing the method of making the nozzle seen in FIG. 2.

The main body portion 112 is machined to provide a cylindrical key 132 extending from a flat side surface 134 adjacent the rear end 52. The side portion 68 is machined of a tool steel such as H13 to have a matching surface 136 with a cylindrical seat 138 to receive the key 132. The side portion 68 is made with the flat face 70 opposite the surface 136, and has holes 140 to receive the bolts 72. In this embodiment, it also is made with arms 142 which extend to receive the rocker arm 108 therebetween on pin 144. A thin ring 146 of copper is placed in the seat 138 and the side portion 68 is positioned on the main body portion 112 with the two matching surfaces 134,136 abutting against each other. After the flanged sleeves 115 have been inserted to seal spaces 114 around the cartridge heaters 88, a filler tube 148 is welded to the outer surface 48 of the main body portion 112 to insert copper through an opening 150 which has been drilled to connect to the wells 88. A slug of copper 152 is placed in each filler tube as described in Canadian Pat. Nos. 1,177,215 to Gellert entitled "Heater Installation in Molding Members" which issued Nov. 6, 1984 and 1,198,266 to Gellert entitled "Method of Manufacture of an Injection Molding Integral Heated Probe" which issued Dec. 24, 1985.

After the components are assembled as described above, they are heated in batches in a vacuum furnace to a temperature of about 2000° F. This causes the copper slugs 152 to melt and the copper flows into the spaces 114 around the heaters 88 and forms an integral metalurgical bond with the steel of the main body portion 112. This provides uniform heat transfer to the melt flowing through the main body portion and avoids hot spots forming along the heaters. At the same time, the copper ring 130 around the plug 120 melts and the copper flows around the plug to integrally braze it into position. Similarly, the copper ring 146 melts and the copper flows between the matching surfaces 134,136 to integrally braze them together, with the face 70 of the side portion 68 facing sideways.

Figures 5, 6, 7:
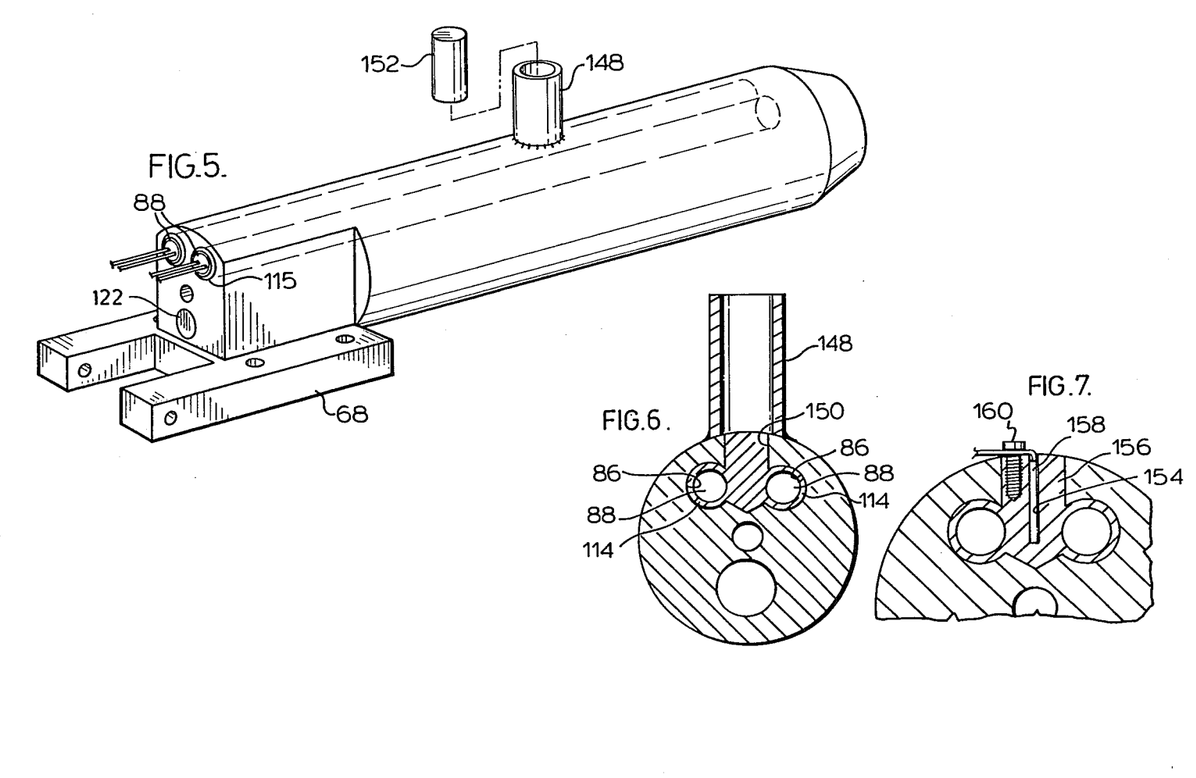
FIG. 5 is an isometric view showing a filler tube in position on a nozzle.
FIG. 6 is a sectional view showing the filler tube in FIG. 5.
FIG. 7 is a similar sectional view showing the thermocouple installation.

Next, a bore is drilled from the face 70 of the side portion 68 to form the lateral portion 76 of the belt channel 74. As can be seen, this provides the smoothly curved bend 84 where the lateral portion 76 joins the longitudinal portion 78 in the plug 120. The valve pin bore 54 is drilled to extend centrally through the main body portion 112 from the rear end 52 to the forward end 50. The mouth 56 of the valve pin bore 54 at the forward end is drilled to enlarge it, and the diagonal portion 80 is drilled through the mouth to connect to the well 116 to form the longitudinal portion 78 of the melt channel and connect it to the valve pin bore 54. The enlarged mouth 56 is threaded and the tip insert 58 is screwed firmly into place. The nozzle 10 is machined to provide a tapered forward end 50, remove the filler tube 148 and provide a smooth finish. A hole 154 is drilled into the copper 156 to receive a thermocouple 158 which is held in place by screw 160. Due to the high conductivity of the copper 156, this provides an accurate temperature measurement.

Figure 8:
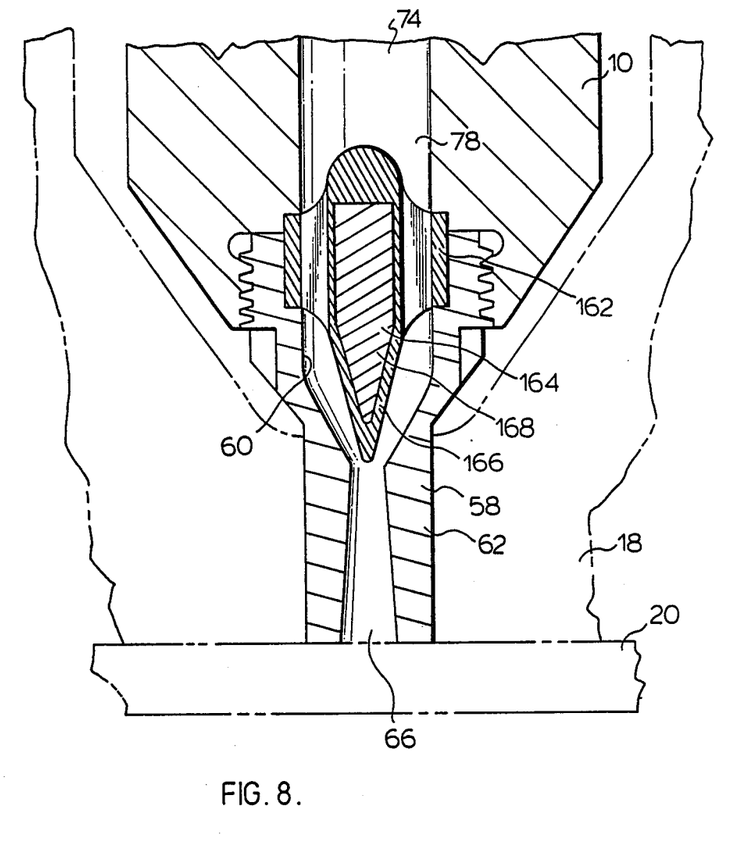
FIG. 8 is a partial sectional view showing another embodiment of the invention.

FIG. 8 shows a further embodiment of the invention and elements common to the first embodiment are also described and illustrated using the same reference numerals. In this embodiment, the nozzles 10 are hot tip gated rather than valve-gated. Thus, there is no valve pin and no actuating mechanism. As may be seen, in this embodiment the longitudinal portion 78 of the melt channel 74 extends centrally in the nozzle 10. A tip insert 58 which is screwed into the forward end 50 of the nozzle 10 holds a torpedo assembly 162 securely in place. The ribbed torpedo assembly 162 has an elongated torpedo 164 which extends centrally in the bore 60 of the tip insert which is in alignment with the longitudinal portion 78 of the melt channel 74. As described in U.S. Pat. No. 4,450,999 to Gellert which issued May 29, 1984, the torpedo has an outer portion 166 made of high speed steel to be abrasion and corrosion resistant and an inner portion 168 made of copper which is highly conductive to improve the flow of heat to the area of the gate 66. As described above, the tip insert 58 has a nose portion 62 which is located in an opening 64 in the core 18 and provides the gate 66 leading to the cavity 20.

While the description of the system and the method of making the nozzles have been given with respect to preferred embodiments, it is not to be construed in a limiting sense. Variations and modifications will occur to those skilled in the art. For example, if the actuating mechanism 110 were located in alignment with the valve pin, as is often the case, the side portion 68 would not extend to provide a mounting for the rocker arm 108. Reference is made to the appended claims for a definition of the invention.

What is claimed is:

1. In a multi-gate injection molding apparatus having an elongated manifold and a plurality of heated nozzles, the manifold having a longitudinal melt bore extending from an inlet to a plurality of outlet bores, each outlet bore leading to an outlet on a side surface of the manifold, each nozzle being located in a well in a core and having a forward and a rear end with a melt channel extending to a central gate leading to a common cavity, the improvement wherein;

each nozzle has a side portion extending to a face which projects sidewards from the well adjacent the rear end, the melt channel of each nozzle has a lateral portion and a generally longitudinal portion, laterally offset from a central axis of the nozzle the lateral portion extending from an inlet on the face of the side portion around a smoothly curved bend to the longitudinal portion, the longitudinal portion leading to the gate adjacent the forward end, and each nozzle is secured to the manifold with the face of the side portion abutting against a side surface of the manifold with the melt channel inlet in alignment with a respective outlet from the manifold, with provision for slight lateral movement therebetween to provide for thermal expansion of the manifold.

2. An injection molding apparatus as claimed in claim 1 wherein each nozzle is bolted in position to the manifold.

3. An injection molding apparatus as claimed in claim 1 wherein each well has a mouth and a generally cylindrical inner wall and a portion of each nozzle received in the well has a generally cylindrical outer surface, the inner wall of the well being spaced from the outer surface of the nozzle to provide an insulative air space therebetween, each nozzle having adjustable locating means spaced circumferentially around the outer surface to bridge the insulative air space and contact the inner wall of the respective well adjacent its mouth to accurately locate the nozzle in the well.

4. An injection molding apparatus as claimed in claim 3 wherein each nozzle has a removable tool steel tip insert with a torpedo centrally mounted in a central bore in alignment with the melt channel, the tip insert having a nose portion which engages the cone to locate the forward end of the nozzle in alignment with the gate.

5. An injection molding apparatus as claimed i n claim 1 wherein each nozzle has a central valve pin bore extending between the forward and rear ends, an elongated valve pin having a driven end and a tip end mounted in the central bore, the driven end of the valve pin being operatively connected to valve pin actuating mechanism whereby the valve pin is reciprocated between a retracted open position and a closed position wherein the tip end of the valve pin is seated in the respective gate, and the longitudinal portion of the melt channel and the central valve pin bore join adjacent the forward end.

6. An injection molding apparatus as claimed in claim or 5 wherein each nozzle has at least one electrical cartridge heater cast into a well extending parallel to the central valve pin bore.

7. An injection molding apparatus as claimed in claim 5 wherein each well has a mouth and a generally cylindrical inner wall and a portion of each nozzle received in the well has a generally cylindrical outer surface, the inner wall of the well being spaced from the outer surface of the nozzle to provide an insulative air space therebetween, each nozzle having adjustable locating means spaced circumferentially around the outer surface to bridge the insulative air space and contact the inner wall of the respective well adjacent its mouth to accurately locate the nozzle in the well.

8. An injection molding apparatus as claimed as claim 7 wherein each nozzle has a removable tool steel tip insert with a central bore in alignment with the valve pin bore, the tip insert having a nose portion which engages the cone to locate the forward end of the nozzle in alignment with the gate.

9. An injection molding apparatus as claimed in claim 8 wherein the outlet bores in the manifold extend from the longitudinal melt bore to outlets on opposing side surfaces of the manifold, and a plurality of nozzles are secured to each of the opposing side surfaces with an inlet of a nozzle in alignment with each of the outlets from the manifold.

10. An injection molding apparatus as claimed in claim 8 wherein the nose portion of the tip insert is received in an opening through the cavity plate to the cavity, whereby the central bore extending through the nose portion forms the gate to the cavity.

11. An injection molding apparatus as claimed in claim 8 wherein the side portion of each nozzle projects past the rear end of the nozzle to provide a mounting for actuating mechanism pivot means.

* * * * *